United States Patent
Tsai et al.

(10) Patent No.: US 8,582,219 B2
(45) Date of Patent: *Nov. 12, 2013

(54) OPTICAL LENS ASSEMBLY FOR IMAGE CAPTURE

(75) Inventors: Tsung-Han Tsai, Taichung (TW); Dung Yi Hsieh, Taichung (TW); Ming-Ta Chou, Taichung (TW)

(73) Assignee: Largan Precision Co., Taichung (TW)

( * ) Notice: Subject to any disclaimer, the term of this patent is extended or adjusted under 35 U.S.C. 154(b) by 189 days.

This patent is subject to a terminal disclaimer.

(21) Appl. No.: 13/190,430

(22) Filed: Jul. 25, 2011

(65) Prior Publication Data

US 2012/0257288 A1    Oct. 11, 2012

(30) Foreign Application Priority Data

Apr. 8, 2011   (TW) .............................. 100112351 A

(51) Int. Cl.
*G02B 9/14*   (2006.01)
*G02B 13/18*  (2006.01)

(52) U.S. Cl.
USPC ......................................... 359/785; 359/716

(58) Field of Classification Search
USPC ......... 359/713–716, 754–758, 764, 766, 769, 359/772–774, 779, 785
See application file for complete search history.

(56) References Cited

U.S. PATENT DOCUMENTS

| | | | |
|---|---|---|---|
| 6,977,779 B2 * | 12/2005 | Shinohara | 359/716 |
| 7,301,712 B2 | 11/2007 | Kamo | |
| 7,460,314 B2 | 12/2008 | Shyu et al. | |
| 7,529,041 B2 | 5/2009 | Huang et al. | |
| 7,532,416 B2 | 5/2009 | Iiyama et al. | |
| 7,706,086 B2 | 4/2010 | Noda | |
| 7,710,662 B2 | 5/2010 | Nakanishi | |
| 7,911,715 B2 * | 3/2011 | Shinohara | 359/779 |
| 8,014,080 B1 * | 9/2011 | Chen et al. | 359/715 |
| 2006/0119958 A1 * | 6/2006 | Jeong | 359/785 |
| 2009/0046360 A1 | 2/2009 | Funk et al. | |
| 2012/0099009 A1 * | 4/2012 | Hsu et al. | 348/294 |
| 2012/0243109 A1 * | 9/2012 | Hsu et al. | 359/716 |

FOREIGN PATENT DOCUMENTS

WO     2010026689 A1    1/2009

* cited by examiner

*Primary Examiner* — Jordan Schwartz
(74) *Attorney, Agent, or Firm* — Wang Law Firm, Inc.; Li K. Wang; Stephen Hsu

(57) ABSTRACT

An optical lens assembly for image capture, sequentially arranged from an object side to an image side, comprises: the first lens element with positive refractive power having a concave object-side surface and a convex image-side surface, the second lens element with negative refractive power having a concave object-side surfaces and a convex image-side surface, the third lens element with positive refractive power having a convex object-side surface and a concave image-side surface. Additionally, the optical lens assembly for image capture can satisfy several conditions. By such arrangements, the optical assembly for image capture can effectively correct the aberration and be applied to a compact image pickup device for image capturing.

20 Claims, 12 Drawing Sheets

OPTICAL LENS ASSEMBLY FOR IMAGE CAPTURE

BACKGROUND OF THE INVENTION

1. Field of the Invention

The present invention relates to an optical lens assembly for image capture, and more particularly to an optical lens assembly for image capture comprised of three lens elements and applies to compact electronic products.

2. Description of the Related Art

In electronic products such as digital still cameras, mobile phone cameras and web cameras, an optical lens assembly for image capture is installed for capturing images, and the optical lens assembly tends to be developed with a compact design and a low cost, while meeting the user requirements for high resolution, good aberration correction, high image quality.

In general, a conventional optical lens assembly of a mini electronic product comes with different designs, including the two-lens, three-lens, four-lens, and five-or-more lens designs. If the image quality is taken into consideration, the optical lens assembly for image capture with the four-lens and five-lens designs have advantages on aberration correction and modulation transfer function (MTF) performance, yet they incur a higher cost, and the optical lens assembly for image capture with the two-lens design can hardly meet the high resolution requirement, and thus the optical lens assemblies for image capture with the three-lens design as disclosed in U.S. Pat. Nos. 7,706,086 and 7,460,314 and WIPO Pat. No. WO2010026689 are preferred.

In the optical lens assembly for image capture with the three-lens design, a combination of positive refractive power, negative refractive power and positive refractive power is generally adopted for the design, particularly the first lens element in proximity to the image plane is designed with positive refractive power to increase the width, and the conventional optical lens assembly is generally designed with a bi-convex lens or a convex meniscus lens in the object-side direction as disclosed in U.S. Pat. Nos. 7,710,662, 7,532,416, 7,529,041 and 2009/046380. Although these designs can provide more powerful positive refractive power to the first lens element nearest to the object side, the aberration and distortion of images caused by the second lens element and the third lens element cannot be compensated or corrected easily to meet the requirements for a high-quality optical lens assembly for image capture. To overcome the aforementioned drawback, the optical lens assembly for image capture as disclosed in U.S. Pat. No. 7,301,712 adopts the design of the first lens element having a concave object-side surface and the second lens element having a concave object-side surface, such that the positive refractive power of the first lens element will not be too large. Although the total length of this optical lens assembly for image capture can be shortened, the change of curvature of the second lens element is too large, such that the manufacture is not easy, and the refractive power of the second lens element is higher than the refractive power of the first lens element. As a result, the optical lens assembly for image capture has chromatic aberrations at the edges and more serious aberrations of the images. To overcome the drawbacks of the prior art, it is necessary to have a better design for compensating the aberration, limiting the total length of the optical lens assembly for image capture, and applying to mini electronic devices. Therefore, the present invention provides a feasible design and adopts a combination of refractive powers of the three lens elements and a combination of convex and concave lens elements to achieve the effects of providing a high image quality, facilitating mass production to lower the cost, and applying the optical lens assembly to electronic products.

SUMMARY OF THE INVENTION

Therefore, it is a primary objective of the present invention to provide an optical lens assembly for image capture, sequentially arranged from an object side to an image side along an optical axis, comprising: the first lens element, the second lens element, the third lens element, wherein the first lens element with positive refractive power has a concave object-side surface and a convex image-side surface; the second lens element with negative refractive power has a concave object-side surface and a convex image-side surface; the third lens element with positive refractive power has a convex object-side surface and a concave image-side surface, and the optical lens assembly for image capture satisfies the following relation:

$$1.0 < f/f_1 < 1.9 \quad (1)$$

Wherein, f is the focal length of the optical lens assembly for image capture, and $f_1$ is the focal length of the first lens element.

On the other hand, the present invention provides an optical lens assembly for image capture as described above, further comprising an aperture stop and an image plane, wherein the second lens element and the third lens element are made of plastic; the second lens element has aspheric object-side surface and image-side surface; and the third lens element has aspheric object-side surface and image-side surface, and the optical lens assembly for image capture satisfies one or more of the following relations in addition to the relation (1):

$$0.90 < SL/TTL < 1.20 \quad (2)$$

$$1.2 < f/f_1 < 1.6 \quad (3)$$

$$-2.5 < R_2/R_5 < -0.5 \quad (4)$$

$$0 < T_{23} - T_{12} < 1.3 \quad (5)$$

$$24 < v_1 - v_2 < 40 \quad (6)$$

$$-1.0 < R_3/f < 0 \quad (7)$$

wherein, SL is an axial distance from the stop to an image plane of the optical lens assembly for image capture, TTL is an axial distance from the object-side surface of the first lens element to the image plane, f is the focal length of the optical lens assembly for image capture, $f_1$ is the focal length of the first lens element, $R_2$ is the curvature radius of the image-side surface of the first lens element, $R_3$ is the curvature radius of the object-side surface of the second lens element, $R_5$ is the curvature radius of the object-side surface of the third lens element, $T_{12}$ is an axial distance between the first lens element and the second lens element, $T_{23}$ is an axial distance between the second lens element and the third lens element, $v_1$ is the Abbe number of the first lens element, and $v_2$ is the Abbe number of the second lens element.

In addition, the present invention further provides an optical lens assembly for image capture as described above, wherein the second lens element and the third lens element are made of plastic; the second lens element has aspheric object-side surface and image-side surface; the third lens element has aspheric object-side surface and image-side surface; at least one of the second lens element and third lens element has at least one inflection point; and the optical lens assembly for image capture satisfies one or more of the following relations in addition to the relation (1):

$$-1.2 < R_2/R_5 < -0.8 \qquad (8)$$

$$f_3 > f_1 > |f_2| \qquad (9)$$

$$-0.4 < R_3/f < 0 \qquad (10)$$

wherein, f is the focal length of the optical lens assembly for image capture, $f_1$ is the focal length of the first lens element, $f_2$ is the focal length of the second lens element, $f_3$ is the focal length of the third lens element, $R_2$ is the curvature radius of the image-side surface of the first lens element, $R_3$ is the curvature radius of the object-side surface of the second lens element, and $R_5$ is the curvature radius of the object-side surface of the third lens element.

Another objective of the present invention is to provide an optical lens assembly for image capture, sequentially arranged from an object side to an image side along an optical axis, comprising: the first lens element, the second lens element, and the third lens element; wherein the first lens element with positive refractive power has a concave object-side surface and a convex image-side surface; the plastic second lens element with negative refractive power has aspheric object-side surface and image-side surface; the plastic third lens element with positive refractive power has a convex object-side surface and a concave image-side surface, and both object-side surface and image-side surface thereof are aspheric; and the optical lens assembly for image capture satisfies the relations of:

$$-2.5 < R_2/R_5 < -0.5 \qquad (4)$$

$$0.7 < f/f_3 < 1.4 \qquad (11)$$

wherein, $R_2$ is the curvature radius of the image-side surface of the first lens element, $R_5$ is the curvature radius of the object-side surface of the third lens element, f is the focal length of the optical lens assembly for image capture, and $f_3$ is the focal length of the third lens element.

On the other hand, the present invention provides an optical lens assembly for image capture as described above, wherein at least one of the second lens element and the third lens element has at least one inflection point; and the optical lens assembly for image capture satisfies one or more of the following relations in addition to the relations (4) and (11):

$$24 < v_1 - v_2 < 40 \qquad (6)$$

$$1.2 < f/f_1 < 1.6 \qquad (3)$$

$$f_3 > f_1 > |f_2| \qquad (9)$$

$$-0.4 < R_3/f < 0 \qquad (10)$$

wherein, f is the focal length of the optical lens assembly for image capture, $f_1$ is the focal length of the first lens element, $f_2$ is the focal length of the second lens element, $f_3$ is the focal length of the third lens element, $R_3$ is the curvature radius of the object-side surface of the second lens element, $v_1$ is the Abbe number of the first lens element, and $v_2$ is the Abbe number of the second lens element.

On the other hand, the present invention provides an optical lens assembly for image capture as described above, wherein the second lens element has a concave object-side surface and a convex image-side surface; and the optical lens assembly for image capture satisfies the following relation in addition to the relations (4) and (11):

$$-1.2 < R_2/R_5 < -0.8 \qquad (8)$$

wherein, $R_2$ is the curvature radius of the image-side surface of the first lens element and $R_5$ is the curvature radius of the object-side surface of the third lens element.

In the present invention, the first lens element, second lens element and third lens element are installed with an appropriate interval apart on the optical axis to achieve a good aberration correction and a more advantageous modulation transfer function (MTF) in the condition of a larger field angle.

In the optical lens assembly for image capture of the present invention, the first lens element with more powerful positive refractive power and the second lens element with negative refractive power can provide an effective aberration correction for the first lens element with positive refractive power and correct the Petzval sum of the optical lens assembly to make the edge image surface flatter, while facilitating the aberration correction of the system; the third lens element with positive refractive power can increase the width and correct the aberration produced by the first lens element and the second lens element effectively, such that the overall aberration and distortion of the optical lens assembly for image capture can meet the high resolution requirement.

In the optical lens assembly for image capture of the present invention, an aperture stop can be added, and the aperture stop is a front aperture stop installed between the first lens element and an object to be photographed to provide a longer distance between an exit pupil of the optical lens assembly for image capture and the image plane, and the light of an image can be projected directly and received by an image sensor to avoid dark corners and achieve the telecentric effect on the image side. In general, the telecentric effect can improve the brightness of the image plane and enhance the efficiency of receiving images by the CCD or CMOS image sensor.

In the optical lens assembly for image capture of the present invention, an inflection point is designed at the second lens element or the third lens element and provided for guiding light of an image with an angle out from the edges of the second lens element or the third lens element, such that the light of an image at the off-axis view angle is guided to the image sensor and received by the image sensor. In addition, the second lens element comes with a convex image-side surface, and the combination of the convex object-side surface of the third lens element can shorten the total length of the optical lens assembly for image capture effectively in order to apply the optical lens assembly to mini electronic devices.

DETAILED DESCRIPTION OF THE PREFERRED EMBODIMENTS

Figure 1A:
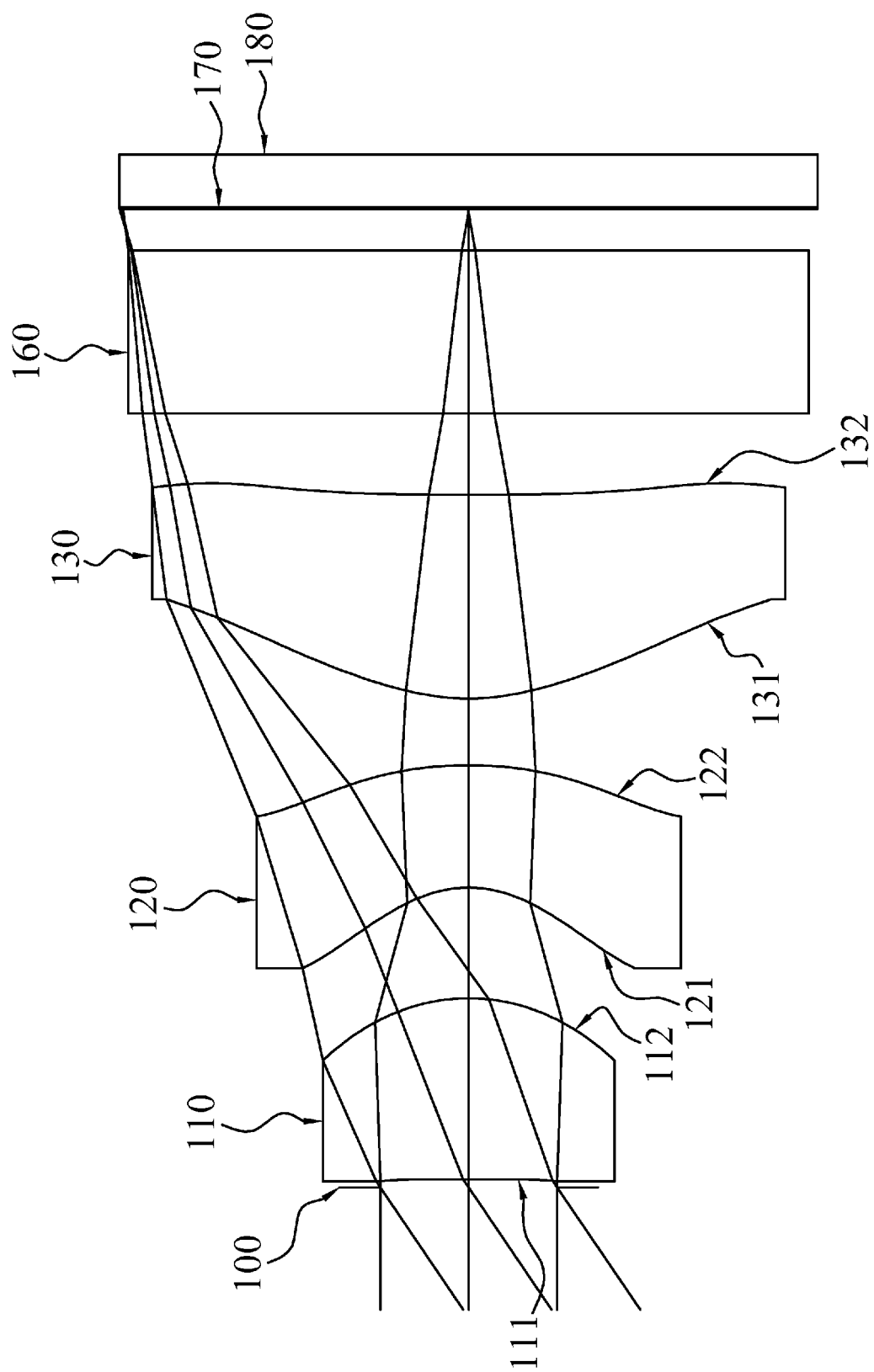
FIG. 1A is a schematic view of an optical lens assembly for image capture in accordance with the first preferred embodiment of the present invention.

With reference to FIG. 1A for an optical lens assembly for image capture of the present invention, the optical lens assembly for image capture, sequentially arranged from an object side to an image side along an optical axis, comprises: the first lens element (110), the second lens element (120) and the third lens element (130); wherein the first lens element (110) with positive refractive power has a concave object-side surface (111) and a convex image-side surface (112); the plastic second lens element (120) with negative refractive power has a concave object-side surface (121) and a convex image-side surface (122), and both object-side surface (121) and image-side surface (122) thereof are aspheric; the plastic third lens element (130) with positive refractive power has a convex object-side surface (131) and a concave image-side surface (132), and both object-side surface (131) and image-side surface (132) thereof are aspheric; at least one of the second lens element (120) and the third lens element (130) has at least one inflection point; the optical lens assembly for image capture further comprises an aperture stop (100) and an IR-filter (160), and the aperture stop (100) is a front aperture stop installed between the first lens element (110) and an object to be photographed; the IR-filter (160) is installed between the third lens element (130) and the image plane (170) and generally made of a plate optical material without affecting the overall focal length of the optical lens assembly for image capture of present invention. The optical lens assembly for image capture further comprises an image sensor (180) installed at the image plane (170) for imaging the object to be photographed. The first lens element (110), the second lens element (120) and the third lens element (130) come with aspheric optical surface in compliance with the aspherical surface formula as given in Equation (12):

$$X(Y) = \frac{(Y^2/R)}{1 + \sqrt{(1-(1+K)(Y/R)^2)}} + \sum_i (A_i) \cdot (Y^i) \quad (12)$$

Wherein, X is the relative height from a point on the aspherical surface with a distance Y from the optical axis to a tangent plane at the tip of the optical axis of the aspherical surface;

Y is the distance between a point on the curve of the aspherical surface and the optical axis;

K is the conic coefficient; and $A_i$ is the $i^{th}$ level aspherical surface coefficient.

In the optical lens assembly for image capture of the present invention, the first lens element (110), the second lens element (120) and the third lens element (130) can be made of glass or plastic, and the optical surfaces can be spheric or aspheric surfaces, and if aspheric optical surfaces are adopted, then the curvature radius of the optical surface can be used for changing the refractive power to reduce or eliminate aberrations, so as to decrease the number of lens elements used in the optical lens assembly for image capture and shorten the total length of the optical lens assembly for image capture. With the installation of the aforementioned first lens element (110), second lens element (120) and third lens element (130), the optical lens assembly for image capture of the present invention satisfies the relation (1). If the ratio of the focal length $f_1$ of the first lens element (110) to the total focal length f of the optical lens assembly for image capture is limited, then the first lens element (110) has shorter focal length (relation (1)) and larger refractive power, the refractive power of the first lens element (110) can be adjusted. If the focal length $f_1$ of the first lens element (110) is too small, then the total length of the optical lens assembly for image capture will be too long, and the angle of projecting light into the image sensor of the optical lens assembly for image capture will be greater. If the focal length $f_1$ of the first lens element (110) is too large, then the view field angle of the optical lens assembly for image capture will be too small. Similarly, if the relations (3) and (11) are satisfied, then the third lens element (130) has more appropriate refractive power to facilitate correcting the aberration of the optical lens assembly for image capture.

In the optical lens assembly for image capture of the present invention, if the relation (2) is limited, then the optical lens assembly for image capture can have a good balance between the telecentric property and a wider view field angle, and shorten the total length of the optical lens assembly for image capture effectively. Similarly, if the ratio of the distance $T_{23}$ between the image-side surface (122) of the second lens element (120) and the object-side surface (131) of the third lens element (130) to the distance $T_{12}$ between the image-side surface (112) of the first lens element (110) and the object-side surface (121) of the second lens element (120) as shown in Relation (5), then the light passing through the first lens element (110) and air gap and entering into the third lens element (130) will be refracted within a certain range to reduce the total length.

If the relation (6) is satisfied, the difference between the Abbe number $v_1$ of the first lens element (110) and the Abbe number $v_2$ of the second lens element (120) will not be too small, then the chromatic aberration produced by the first lens element (110) and the second lens element (120) can be corrected effectively to improve the chromatic aberration compensation capability of the second lens element (120).

If the relations (7) and (10) are satisfied, and the ratio is too large since the second lens element (120) has a concave object-side surface (122), then relatively weaker negative refractive power will occur to reduce the chromatic aberration capability; and if the ratio is too small, then relatively stronger negative refractive power will occur and result in a failure of reducing the total length effectively. Therefore, if the relation is limited within an appropriate range, then the effects of correcting the aberration and shortening the total length can be achieved effectively.

If the relation (9) is satisfied, a balance among the focal length $f_1$ of the first lens element (110), the focal length $f_2$ of the second lens element (120) and the focal length $f_3$ of the third lens element (130) can be achieved to allocate required refractive powers for the first lens element (110), the second lens element (120) and the third lens element (130) of the optical lens assembly for image capture, reduce the system sensitivity and correct the aberration of the optical lens assembly for image capture effectively. If the relations (4) and (8) are satisfied, then the spherical aberration of the optical lens assembly for image capture can be corrected effectively.

The optical lens assembly for image capture of the present invention is described by preferred embodiments and related drawings in details as follows.

First Preferred Embodiment

Figure 1B:
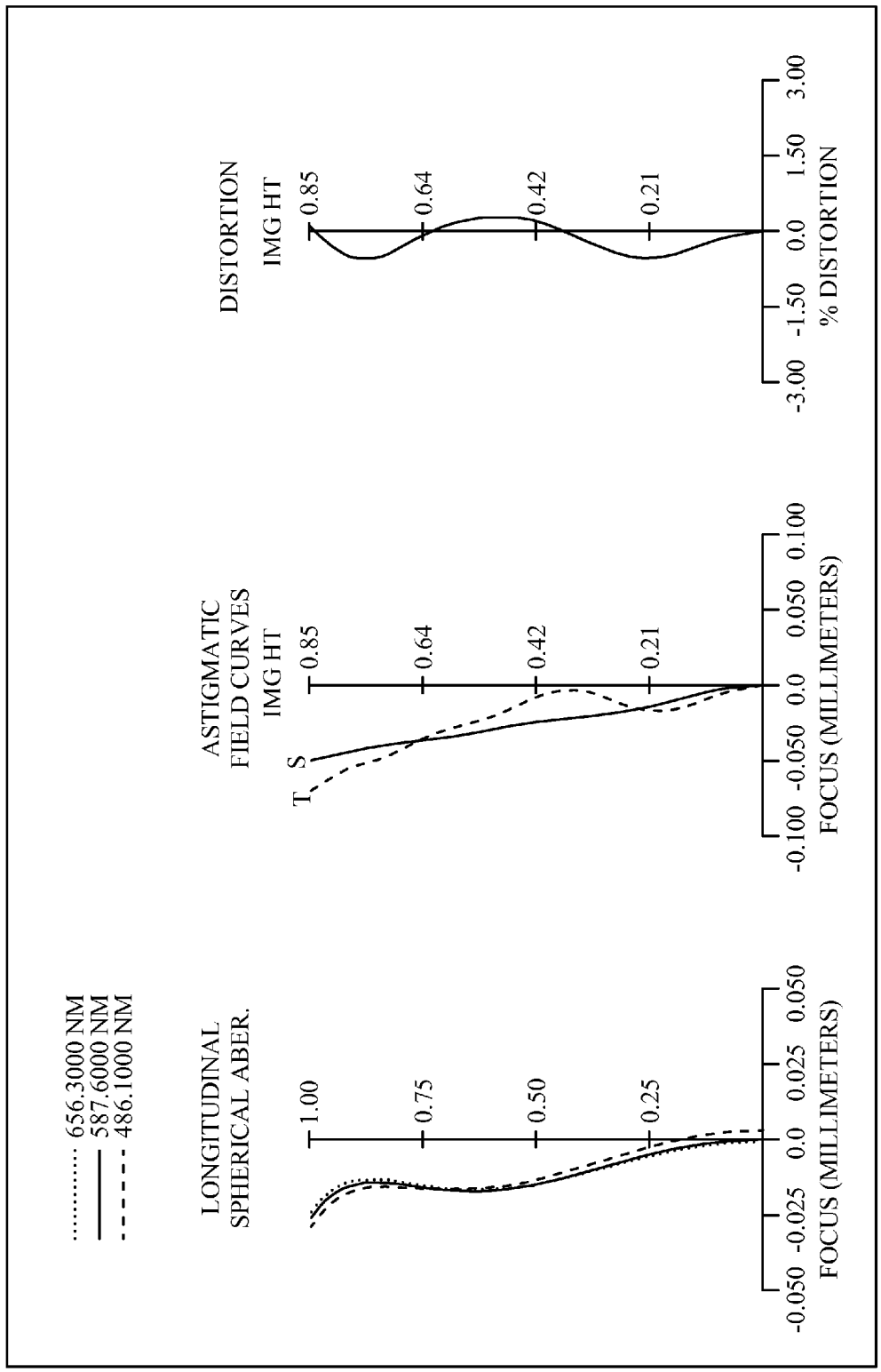
FIG. 1B is a series of aberration curves of the first preferred embodiment of the present invention.

With reference to FIGS. 1A and 1B for a schematic view of an optical lens assembly for image capture and a series of aberration curves in accordance with the first preferred embodiment of the present invention respectively, the optical lens assembly for image capture comprises three lens elements, an aperture stop (100) and an IR-filter (160). More specifically, the optical lens assembly for image capture, sequentially arranged from an object side to an image side along an optical axis, comprises an aperture stop (100): a plastic first lens element (110) with positive refractive power, having a concave object-side surface (111) and a convex image-side surface (112), and both object-side surface (111) and image-side surface (112) thereof being aspheric; a plastic second lens element with negative refractive power (120), having a concave object-side surface (121) and a convex image-side surface (122), and both object-side surface (121) and image-side surface (122) thereof being aspheric; a plastic third lens element with positive refractive power (130), having a convex object-side surface (131) and a concave image-side surface (132), and both object-side surface (131) and image-side surface (132) thereof being aspheric; at least one of the second lens element (120) and the third lens element (130) has at least one inflection point; and the IR-filter (160) is made of a plate glass and provided for adjusting the wavelength range of the light; and an image sensor (180) is installed at the image plane (170). With the combination of the three lens elements, the aperture stop (100) and the IR-filter (160), an image of the object to be photographed can be formed and projected onto the image sensor (180).

The optical data of this preferred embodiment are listed in Table 1, wherein the object-side surface and the image-side surface of the first lens element (110) to the third lens element (130) comply with the aspheric surface formula as given in Equation (12), and their aspheric coefficients are listed in Table 2 as follows:

TABLE 2

Aspheric coefficients of this preferred embodiment

| | Surface # | | |
|---|---|---|---|
| | 2 | 3 | 4 |
| k = | 0.00000E+00 | 1.52617E−01 | −7.95000E−01 |
| A4 = | −1.59805E+00 | 3.57723E−01 | 3.23747E+00 |
| A6 = | −8.96777E+00 | 9.92265E+00 | 1.24937E+01 |
| A8 = | −1.27006E+02 | −3.13342E+01 | 2.37678E+01 |
| A10 = | 2.21038E+03 | −1.22683E+02 | −6.20142E+02 |
| A12 = | 2.39758E−01 | 2.24351E+03 | 9.28116E+02 |
| A14 = | −2.94647E+00 | 7.14304E+01 | 1.59322E+04 |
| A16 = | | | −5.34653E+04 |

| | Surface # | | |
|---|---|---|---|
| | 5 | 6 | 7 |
| k = | 2.55426E+00 | −5.28635E+00 | −1.82750E+01 |
| A4 = | −2.56504E+00 | −1.67351E−01 | 4.72914E−02 |
| A6 = | 3.58539E+01 | 3.16788E+00 | 1.80297E+00 |
| A8 = | −2.26308E+02 | −1.32809E+01 | −6.14915E+00 |
| A10 = | 7.84694E+02 | 2.10426E+01 | −8.13003E−01 |
| A12 = | −4.53827E+02 | −1.18515E+01 | 2.30052E+00 |
| A14 = | −4.37137E+03 | | −2.87521E+01 |
| A16 = | 8.76666E+03 | | 1.05972E+01 |

With reference to Table 1 and FIG. 1B for the optical lens assembly for image capture of this preferred embodiment, the focal length of the optical lens assembly for image capture is f=1.26 (mm), the overall aperture value (f-number) of the optical lens assembly for image capture is Fno=2.90, the half of maximum view angle is HFOV=34.1°. After the optical data of this preferred embodiment are calculated and derived, the optical lens assembly satisfies related relations as shown in Table 3 below, and the related symbols have been described above and thus will not be described again.

TABLE 1

Optical data of this preferred embodiment
F = 1.26 mm, Fno = 2.90, HFOV = 34.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.020 | | | | |
| 2 | Lens 1 | −100.000000 (ASP) | 0.444 | Plastic | 1.544 | 55.9 | 0.86 |
| 3 | | −0.463860 (ASP) | 0.272 | | | | |
| 4 | Lens 2 | −0.286700 (ASP) | 0.300 | Plastic | 1.632 | 23.4 | −0.73 |
| 5 | | −1.064390 (ASP) | 0.164 | | | | |
| 6 | Lens 3 | 0.557060 (ASP) | 0.500 | Plastic | 1.544 | 55.9 | 1.06 |
| 7 | | 11.453100 (ASP) | 0.200 | | | | |
| 8 | IR-filter | Plano | 0.400 | Glass | 1.517 | 64.2 | — |
| 9 | | Plano | 0.102 | | | | |
| 10 | Image | Plano | — | | | | |

Note:
Reference wavelength is 587.6 nm.
ASP stands for aspherical surfaces.

TABLE 3

Data of related relations of this preferred embodiment

| Relation | Data | Relation | Data |
|---|---|---|---|
| $V_1 - V_2$ | 32.5 | $f/f_1$ | 1.47 |
| $R_2/R_5$ | −0.83 | $f/f_3$ | 1.19 |

TABLE 3-continued

Data of related relations of this preferred embodiment

| Relation | Data | Relation | Data |
|---|---|---|---|
| $R_3/f$ | −0.23 | SL/TTL | 1.01 |
| $T_{23}/T_{12}$ | 0.60 | | |

According to the optical data as shown in Table 1 and the aberration curves as shown in FIG. 1B, the optical lens assembly for image capture in accordance with this preferred embodiment of the present invention provides good correction results in aspects of the longitudinal spherical aberration, astigmatic field curving, and distortion.

Second Preferred Embodiment

Figure 2A:
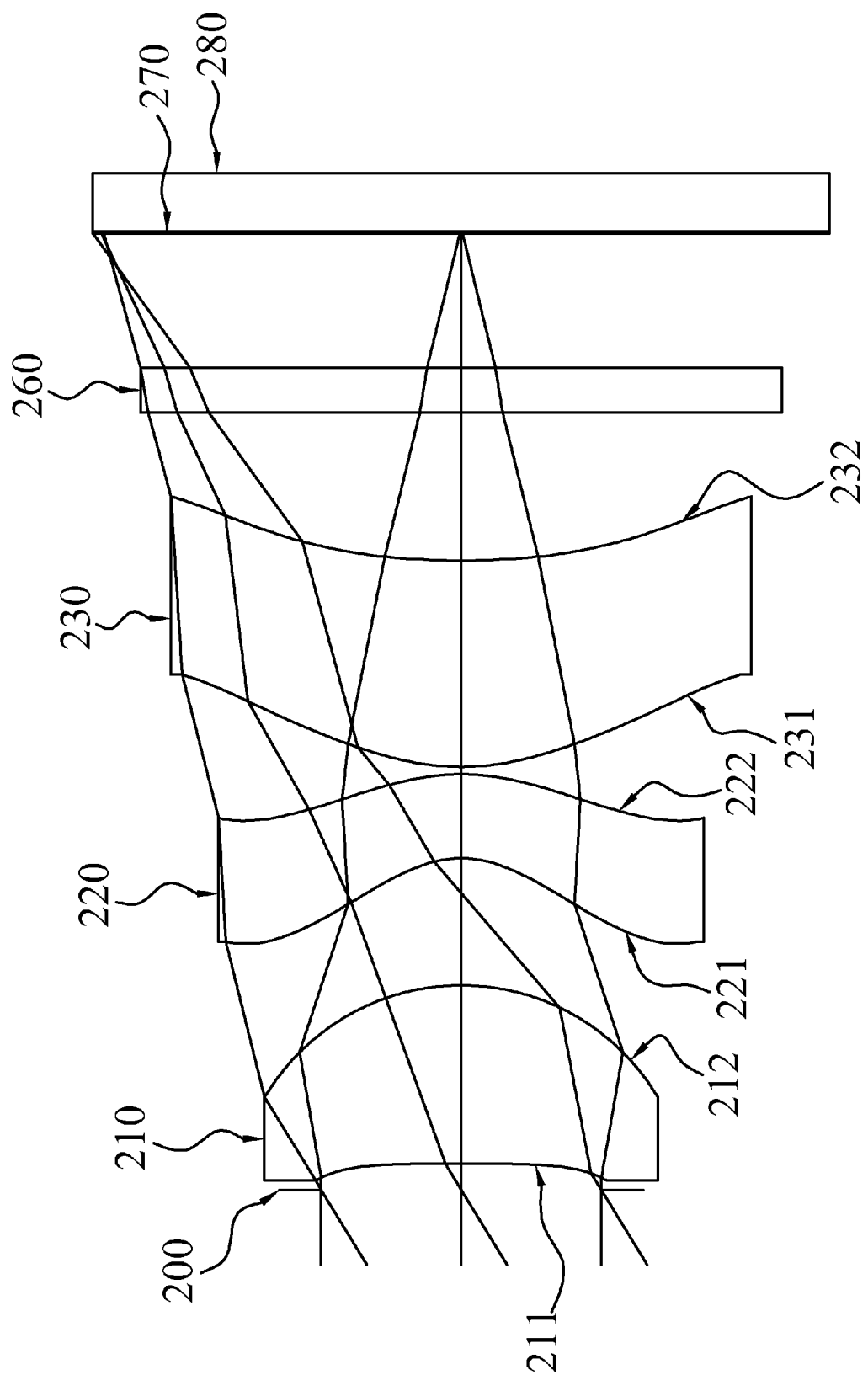
FIG. 2A is a schematic view of an optical lens assembly for image capture in accordance with the second preferred embodiment of the present invention.
Figure 2B:
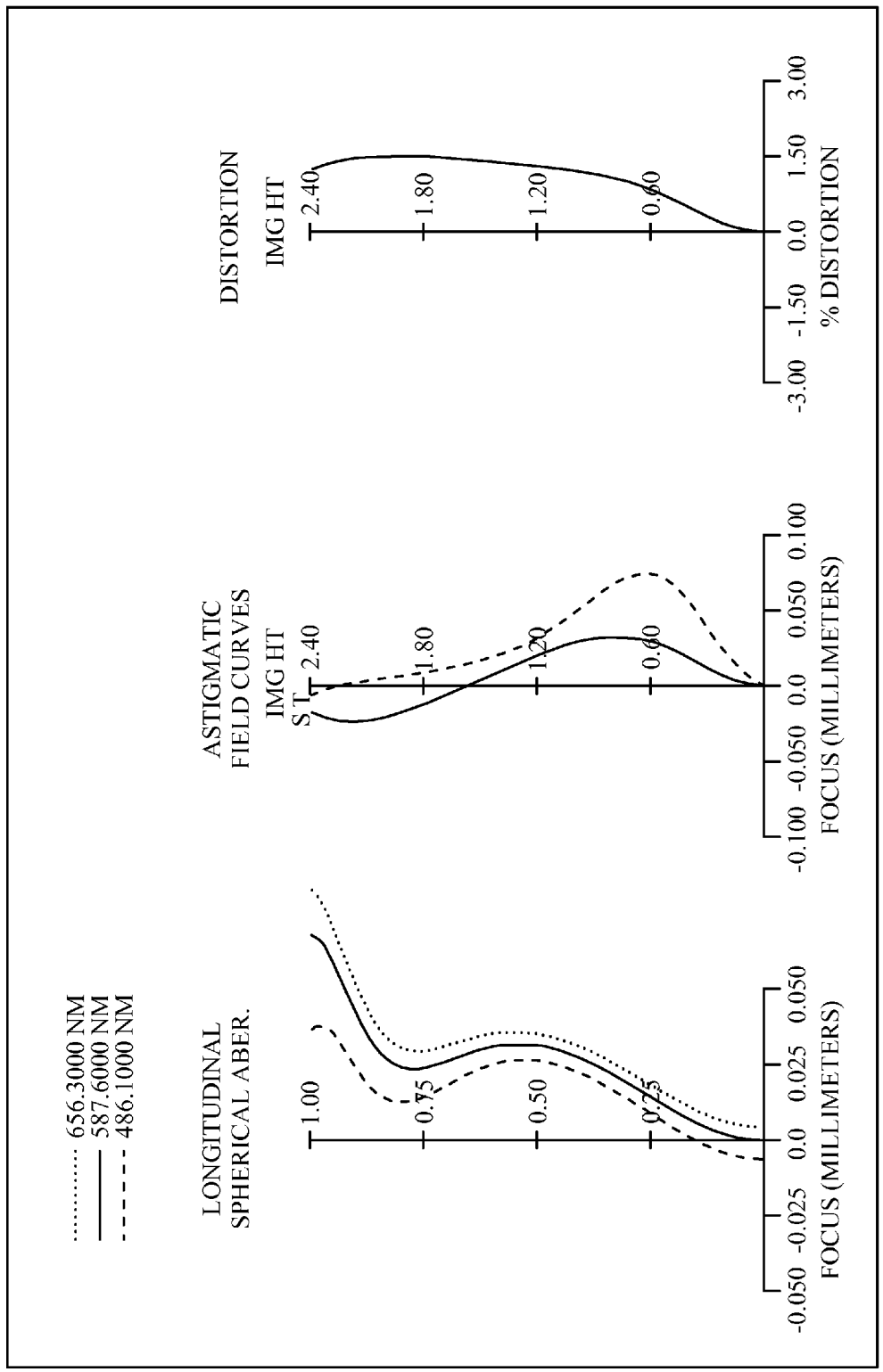
FIG. 2B is a series of aberration curves of the second preferred embodiment of the present invention.

With reference to FIGS. 2A and 2B for a schematic view of an optical lens assembly for image capture and a series of aberration curves in accordance with the second preferred embodiment of the present invention respectively, the optical lens assembly for image capture comprises three lens elements, an aperture stop (200) and an IR-filter (260). More specifically, the optical lens assembly for image capture, sequentially arranged from an object side to an image side along an optical axis, comprises: an aperture stop (200); a plastic first lens element (210) with positive refractive power, having a concave object-side surface (211) and a convex image-side surface (212), and both object-side surface (211) and image-side surface (212) thereof being aspheric; a plastic second lens element with negative refractive power (220), having a concave object-side surface (221) and a convex image-side surface (222), and both object-side surface (221) and image-side surface (222) thereof being aspheric; a plastic third lens element with positive refractive power (230), having a convex object-side surface (231) and a concave image-side surface (232), and both object-side surface (231) and image-side surface (232) thereof being aspheric; at least one of the second lens element (220) and the third lens element (230) has at least one inflection point; and the IR-filter (260) is made of a plate glass and provided for adjusting the wavelength range of the light; and an image sensor (280) is installed at the image plane (270). With the combination of the three lens elements, the aperture stop (200) and the IR-filter (260), an image of the object to be photographed can be formed and projected onto the image sensor (280).

TABLE 4

Optical data of this preferred embodiment
f = 3.87 mm, Fno = 2.07, HFOV = 31.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.174 | | | | |
| 2 | Lens 1 | −100.000000 (ASP) | 1.192 | Plastic | 1.544 | 55.9 | 2.85 |
| 3 | | −1.534430 (ASP) | 0.848 | | | | |
| 4 | Lens 2 | −0.676720 (ASP) | 0.559 | Plastic | 1.632 | 23.4 | −2.66 |
| 5 | | −1.496060 (ASP) | 0.050 | | | | |
| 6 | Lens 3 | 1.578940 (ASP) | 1.377 | Plastic | 1.544 | 55.9 | 3.66 |
| 7 | | 5.283100 (ASP) | 0.989 | | | | |
| 8 | IR-filter | Plano | 0.300 | Glass | 1.517 | 64.2 | — |
| 9 | | Plano | 0.895 | | | | |
| 10 | Image | Plano | — | | | | |

Note:
Reference wavelength is 587.6 nm.
ASP stands for aspherical surfaces.

The optical data of this preferred embodiment are listed in Table 4, wherein the object-side surface and the image-side surface of the first lens element (210) to the third lens element (230) comply with the aspheric surface formula as given in Equation (12), and their aspheric coefficients are listed in Table 5 as follows:

TABLE 5

Aspheric coefficients of this preferred embodiment

| | Surface # | | |
|---|---|---|---|
| | 2 | 3 | 4 |
| k = | −1.00000E+00 | −6.56172E−01 | −2.19285E+00 |
| A4 = | −7.36783E−02 | −3.29288E−02 | 4.88389E−02 |
| A6 = | −2.32643E−02 | 4.59297E−03 | 2.52419E−02 |
| A8 = | −3.51508E−02 | −1.24066E−02 | −1.31428E−02 |
| A10 = | 3.97775E−02 | 5.67279E−03 | 3.86390E−03 |
| A12 = | −4.59866E−02 | 1.11498E−03 | −5.95534E−04 |
| A14 = | 1.16720E−02 | −3.63634E−03 | 2.60397E−05 |
| A16 = | | 1.10122E−03 | −2.83542E−07 |

| | Surface # | | |
|---|---|---|---|
| | 5 | 6 | 7 |
| k = | −4.87703E+00 | −5.78355E+00 | 2.44343E+00 |
| A4 = | 3.16067E−04 | 1.72432E−02 | 1.58431E−02 |
| A6 = | 3.12248E−02 | −3.19476E−03 | −1.21076E−03 |
| A8 = | −9.69527E−03 | −6.11005E−04 | −9.04997E−04 |
| A10 = | −1.30219E−03 | 2.49032E−04 | −2.34949E−04 |
| A12 = | 1.54109E−03 | −8.71114E−05 | 1.57540E−04 |
| A14 = | −2.52709E−04 | 1.94894E−05 | −2.81299E−05 |
| A16 = | 3.27559E−07 | −2.11371E−06 | 1.76891E−06 |

With reference to Table 4 and FIG. 2B for the optical lens assembly for image capture of this preferred embodiment, the focal length of the optical lens assembly for image capture is f=3.87 (mm), the overall aperture value (f-number) of the optical lens assembly for image capture is Fno=2.07, the half of maximum view angle is HFOV=31.4°. After the optical data of this preferred embodiment are calculated and derived, the optical lens assembly satisfies related relations as shown in Table 6 below, and the related symbols have been described above and thus will not be described again.

TABLE 6

Data of related relations of this preferred embodiment

| Relation | Data | Relation | Data |
|---|---|---|---|
| $V_1 - V_2$ | 32.5 | $f/f_1$ | 1.36 |
| $R_2/R_5$ | −0.97 | $f/f_3$ | 1.06 |

TABLE 6-continued

Data of related relations of this preferred embodiment

| Relation | Data | Relation | Data |
|---|---|---|---|
| $R_3/f$ | −0.18 | SL/TTL | 1.03 |
| $T_{23}/T_{12}$ | 0.06 | | |

According to the optical data as shown in Table 4 and the aberration curves as shown in FIG. 2B, the optical lens assembly for image capture in accordance with this preferred embodiment of the present invention provides good correction results in aspects of the longitudinal spherical aberration, astigmatic field curving, and distortion.

Third Preferred Embodiment

Figure 3A:
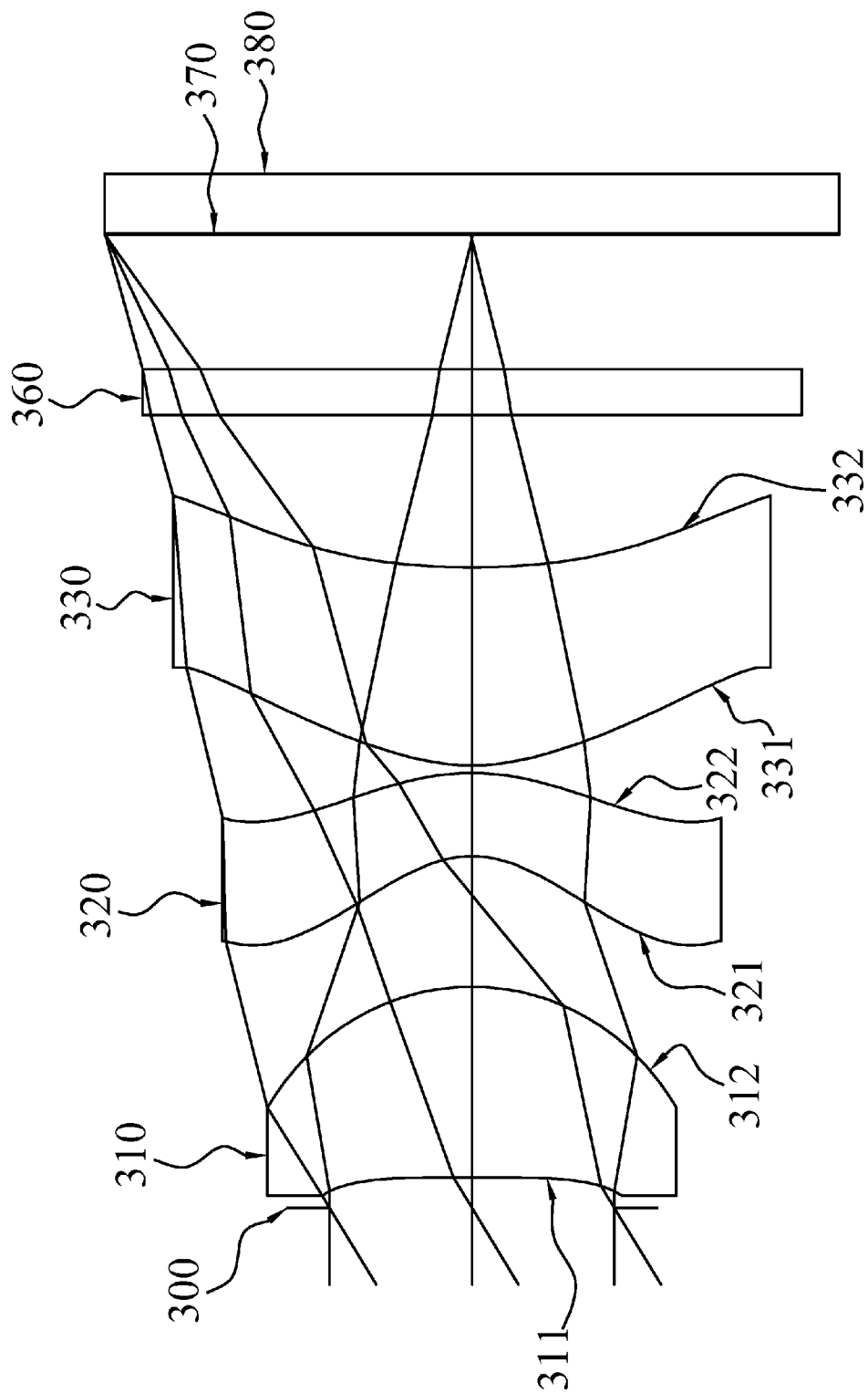
FIG. 3A is a schematic view of an optical lens assembly for image capture in accordance with the third preferred embodiment of the present invention.
Figure 3B:
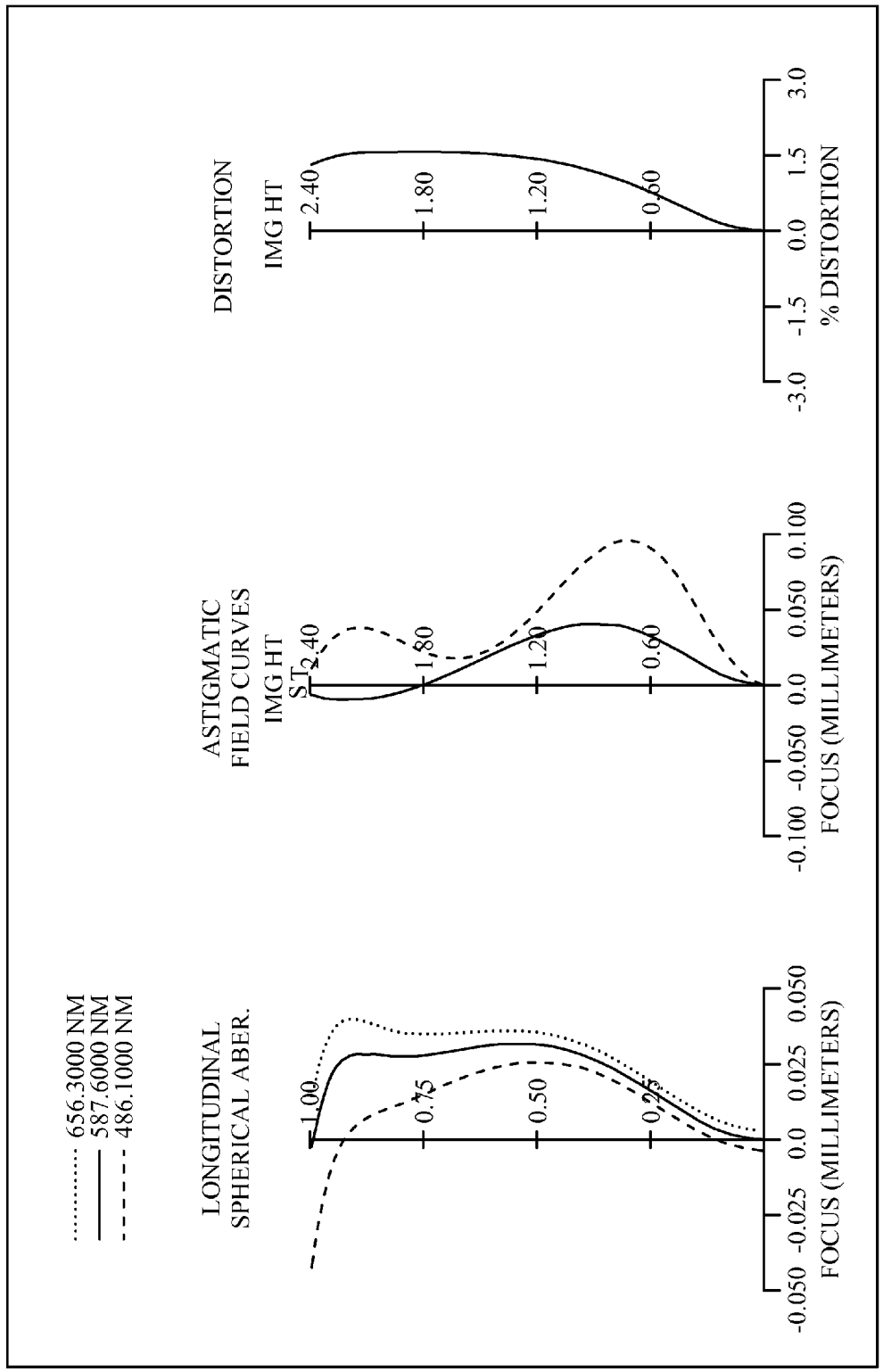
FIG. 3B is a series of aberration curves of the third preferred embodiment of the present invention.

With reference to FIGS. 3A and 3B for a schematic view of an optical lens assembly for image capture and a series of aberration curves in accordance with the third preferred embodiment of the present invention respectively, the optical lens assembly for image capture comprises three lens elements, an aperture stop (300) and an IR-filter (360). More specifically, the optical lens assembly for image capture, sequentially arranged from an object side to an image side along an optical axis, include: a plastic first lens element (310) with positive refractive power, having a concave object-side surface (311) and a convex image-side surface (312), and both object-side surface (311) and image-side surface (312) thereof being aspheric; a plastic second lens element with negative refractive power (320), having a concave object-side surface (321) and a convex image-side surface (322), and both object-side surface (321) and image-side surface (322) thereof being aspheric; a plastic third lens element with positive refractive power (330), having a convex object-side surface (331) and a concave image-side surface (332), and both object-side surface (331) and image-side surface (332) thereof being aspheric; at least one of the second lens element (320) and the third lens element (330) has at least one inflection point; and the IR-filter (360) is made of a plate glass and provided for adjusting the wavelength range of the light; and an image sensor (380) is installed at the image plane (370). With the combination of the three lens elements, the aperture stop (300) and the IR-filter (360), an image of the object to be photographed can be formed and projected onto the image sensor (380).

TABLE 7

Optical data of this preferred embodiment
f = 3.86 mm, Fno = 2.07, HFOV = 31.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.200 | | | | |
| 2 | Lens 1 | −75.585800 (ASP) | 1.250 | Plastic | 1.544 | 55.9 | 2.80 |
| 3 | | −1.502380 (ASP) | 0.857 | | | | |
| 4 | Lens 2 | −0.669290 (ASP) | 0.544 | Plastic | 1.634 | 23.8 | −2.39 |
| 5 | | −1.578340 (ASP) | 0.050 | | | | |
| 6 | Lens 3 | 1.382010 (ASP) | 1.299 | Plastic | 1.514 | 56.8 | 3.32 |
| 7 | | 4.971100 (ASP) | 1.000 | | | | |
| 8 | IR-filter | Plano | 0.300 | Glass | 1.517 | 64.2 | — |
| 9 | | Plano | 0.881 | | | | |
| 10 | Image | Plano | — | | | | |

Note:
Reference wavelength is 587.6 nm.
ASP stands for aspherical surfaces.

The optical data of this preferred embodiment are listed in Table 7, wherein the object-side surface and the image-side surface of the first lens element (310) to the third lens element (330) comply with the aspheric surface formula as given in Equation (12), and their aspheric coefficients are listed in Table 8 as follows:

TABLE 8

Aspheric coefficients of this preferred embodiment

| | Surface # | | |
|---|---|---|---|
| | 2 | 3 | 4 |
| k = | −1.00000E+00 | −7.06053E−01 | −2.20796E+00 |
| A4 = | −6.99528E−02 | −3.09215E−02 | 3.13624E−02 |
| A6 = | −2.16016E−02 | 5.72119E−03 | 3.78895E−02 |
| A8 = | −4.80939E−02 | −1.48856E−02 | −1.68353E−02 |
| A10 = | 4.96613E−02 | 6.91340E−03 | 4.29283E−03 |
| A12 = | −4.59866E−02 | 1.11498E−03 | −5.95534E−04 |
| A14 = | 1.16720E−02 | −3.63634E−03 | 2.60397E−05 |
| A16 = | | 1.10122E−03 | −2.83545E−07 |

| | Surface # | | |
|---|---|---|---|
| | 5 | 6 | 7 |
| k = | −3.84662E+00 | −6.20740E+00 | 2.85888E+00 |
| A4 = | −9.18698E−04 | 2.33477E−02 | 2.41460E−02 |
| A6 = | 3.22287E−02 | −6.22117E−03 | −6.97905E−03 |
| A8 = | −9.25653E−03 | −1.33701E−04 | 4.97141E−05 |
| A10 = | −7.72659E−04 | 2.54401E−04 | −1.28197E−04 |
| A12 = | 1.12224E−03 | −6.16812E−05 | 1.31985E−04 |
| A14 = | −1.78369E−04 | 1.23450E−05 | −3.44305E−05 |
| A16 = | 3.27561E−07 | −2.38161E−06 | 2.77393E−06 |

Figure 4A:
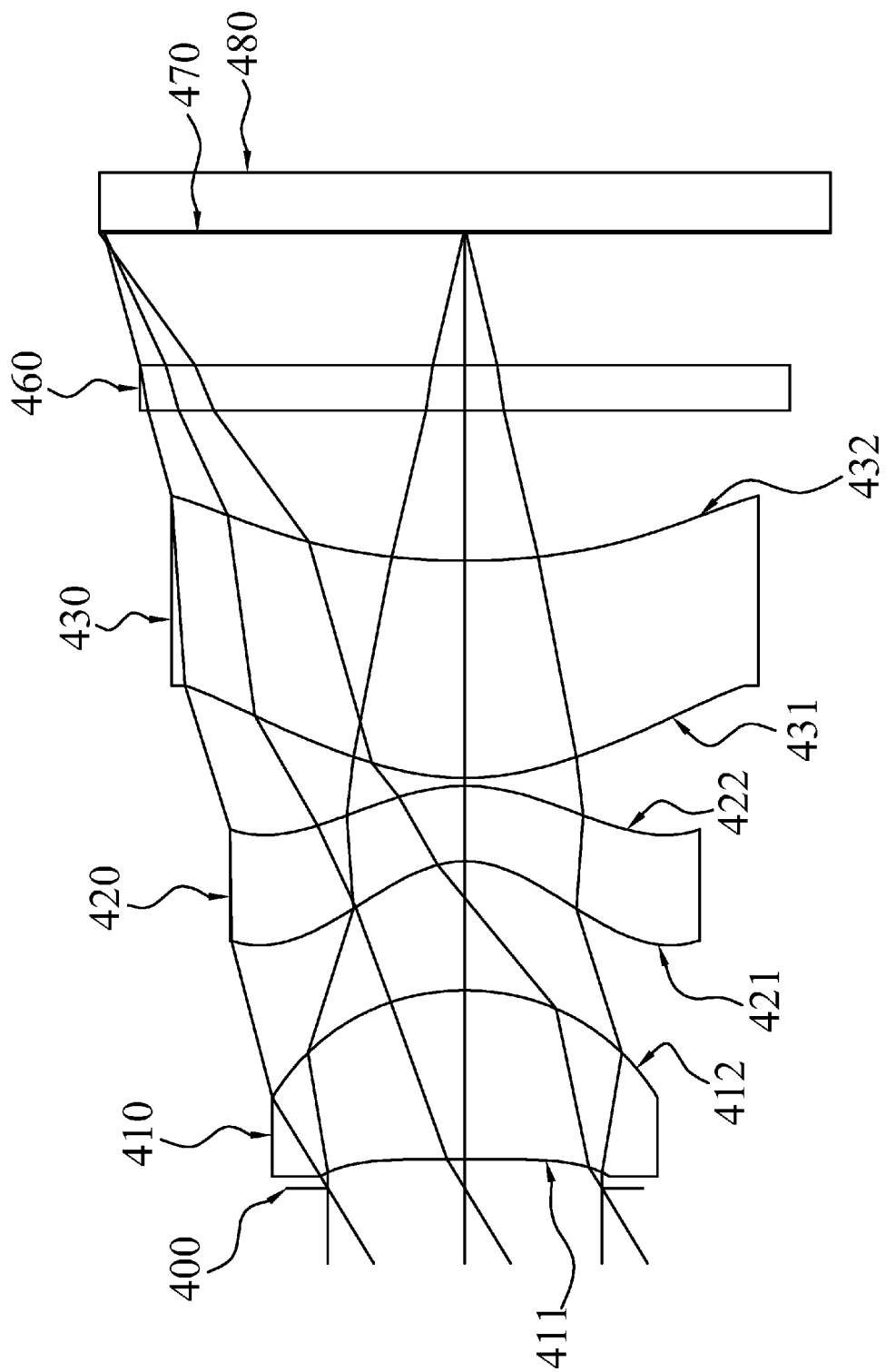
FIG. 4A is a schematic view of an optical lens assembly for image capture in accordance with the fourth preferred embodiment of the present invention.
Figure 4B:
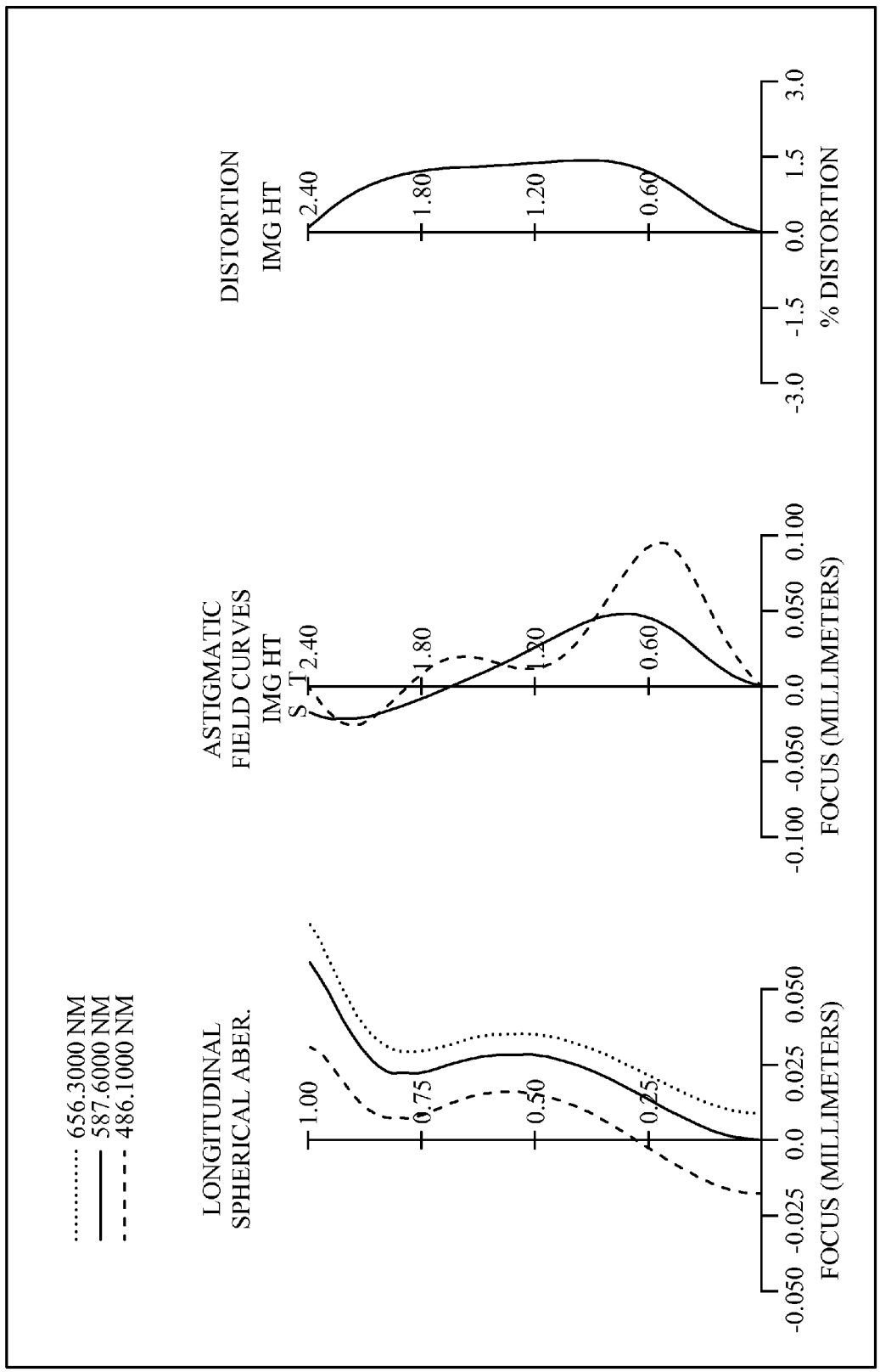
FIG. 4B is a series of aberration curves of the fourth preferred embodiment of the present invention.

With reference to Table 7 and FIG. 4B for the optical lens assembly for image capture of this preferred embodiment, the focal length of the optical lens assembly for image capture is f=3.86 (mm), the overall aperture value (f-number) of the optical lens assembly for image capture is Fno=2.07, the half of maximum view angle is HFOV=31.4°. After the optical data of this preferred embodiment are calculated and derived, the optical lens assembly satisfies related relations as shown in Table 9 below, and the related symbols have been described above and thus will not be described again.

TABLE 9

Data of related relations of this preferred embodiment

| Relation | Data | Relation | Data |
|---|---|---|---|
| $V_1 - V_2$ | 32.1 | $f/f_1$ | 1.38 |
| $R_2/R_5$ | −1.09 | $f/f_3$ | 1.16 |

TABLE 9-continued

Data of related relations of this preferred embodiment

| Relation | Data | Relation | Data |
|---|---|---|---|
| $R_3/f$ | −0.17 | SL/TTL | 1.03 |
| $T_{23}/T_{12}$ | 0.06 | | |

According to the optical data as shown in Table 7 and the aberration curves as shown in FIG. 3B, the optical lens assembly for image capture in accordance with this preferred embodiment of the present invention provides good correction results in aspects of the longitudinal spherical aberration, astigmatic field curving, and distortion.

Fourth Preferred Embodiment

With reference to FIGS. 4A and 4B for a schematic view of an optical lens assembly for image capture and a series of aberration curves in accordance with the fourth preferred embodiment of the present invention respectively, the optical lens assembly for image capture comprises three lens elements, an aperture stop (400) and an IR-filter (460). More specifically, the optical lens assembly for image capture, sequentially arranged from an object side to an image side along an optical axis, include: a plastic first lens element (410) with positive refractive power, having a concave object-side surface (411) and a convex image-side surface (412), and both object-side surface (411) and image-side surface (412) thereof being aspheric; a plastic second lens element with negative refractive power (420), having a concave object-side surface (421) and a convex image-side surface (422), and both object-side surface (421) and image-side surface (422) thereof being aspheric; a plastic third lens element with positive refractive power (430), having a convex object-side surface (431) and a concave image-side surface (432), and both object-side surface (431) and image-side surface (432) thereof being aspheric; at least one of the second lens element (420) and the third lens element (430) has at least one inflection point; and the IR-filter (460) is made of a plate glass and provided for adjusting the wavelength range of the light; and an image sensor (480) is installed at the image plane (470). With the combination of the three lens elements, the aperture stop (400) and the IR-filter (460), an image of the object to be photographed can be formed and projected onto the image sensor (480).

TABLE 10

Optical data of this preferred embodiment
f = 3.92 mm, Fno = 2.15, HFOV = 31.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.194 | | | | |
| 2 | Lens 1 | −116.144000 (ASP) | 1.124 | Plastic | 1.544 | 55.9 | 2.98 |
| 3 | | −1.606470 (ASP) | 0.859 | | | | |
| 4 | Lens 2 | −0.649330 (ASP) | 0.501 | Plastic | 1.632 | 23.4 | −3.42 |
| 5 | | −1.204780 (ASP) | 0.054 | | | | |
| 6 | Lens 3 | 1.766450 (ASP) | 1.446 | Plastic | 1.514 | 56.8 | 4.69 |
| 7 | | 4.790600 (ASP) | 1.000 | | | | |
| 8 | IR-filter | Plano | 0.300 | Glass | 1.517 | 64.2 | — |
| 9 | | Plano | 0.883 | | | | |
| 10 | Image | Plano | — | | | | |

Note:
Reference wavelength is 587.6 nm.
ASP stands for aspherical surfaces.

The optical data of this preferred embodiment are listed in Table 10, wherein the object-side surface and the image-side surface of the first lens element (410) to the third lens element (430) comply with the aspheric surface formula as given in Equation (12), and their aspheric coefficients are listed in Table 11 as follows:

TABLE 11

Aspheric coefficients of this preferred embodiment

| | Surface # | | |
|---|---|---|---|
| | 2 | 3 | 4 |
| k = | −1.00000E+00 | −4.51379E−01 | −1.91850E+00 |
| A4 = | −7.77668E−02 | −4.75341E−02 | 7.14087E−02 |
| A6 = | −2.97839E−02 | 1.05719E−02 | 3.55338E−02 |
| A8 = | −3.74519E−02 | −1.25920E−02 | −2.01673E−02 |
| A10 = | 4.12467E−02 | 5.17823E−03 | 4.99003E−03 |
| A12 = | −4.59866E−02 | 1.11498E−03 | −5.95534E−04 |
| A14 = | 1.16720E−02 | −3.63634E−03 | 2.60398E−05 |
| A16 = | | 1.10122E−03 | −2.83506E−07 |

| | Surface # | | |
|---|---|---|---|
| | 5 | 6 | 7 |
| k = | −3.74258E+00 | −3.85630E+00 | 1.17390E+00 |
| A4 = | 1.22120E−02 | −3.08542E−03 | 8.63311E−03 |
| A6 = | 3.76926E−02 | 3.73071E−03 | 1.33702E−02 |

TABLE 11-continued

Aspheric coefficients of this preferred embodiment

| A8 = | −1.00069E−02 | −1.17415E−03 | −1.62321E−03 |
| A10 = | −2.67160E−03 | 8.53846E−05 | −8.88797E−05 |
| A12 = | 2.03170E−03 | −9.02579E−05 | 1.65016E−04 |
| A14 = | −2.87422E−04 | 3.76247E−05 | −3.54292E−05 |
| A16 = | 3.27554E−07 | −4.35877E−06 | 2.51752E−06 |

With reference to Table 10 and FIG. 4B for the optical lens assembly for image capture of this preferred embodiment, the focal length of the optical lens assembly for image capture is f=3.92 (mm), the overall aperture value (f-number) of the optical lens assembly for image capture is Fno=2.15, the half of maximum view angle is HFOV=31.3°. After the optical data of this preferred embodiment are calculated and derived, the optical lens assembly satisfies related relations as shown in Table 12 below, and the related symbols have been described above and thus will not be described again.

TABLE 12

Data of related relations of this preferred embodiment

| Relation | Data | Relation | Data |
|---|---|---|---|
| $V_1 - V_2$ | 32.5 | $f/f_1$ | 1.31 |
| $R_2/R_5$ | −0.91 | $f/f_3$ | 0.84 |
| $R_3/f$ | −0.17 | SL/TTL | 1.03 |
| $T_{23}/T_{12}$ | 0.06 | | |

According to the optical data as shown in Table 10 and the aberration curves as shown in FIG. 4B, the optical lens assembly for image capture in accordance with this preferred embodiment of the present invention provides good correction results in aspects of the longitudinal spherical aberration, astigmatic field curving, and distortion.

Fifth Preferred Embodiment

Figure 5A:
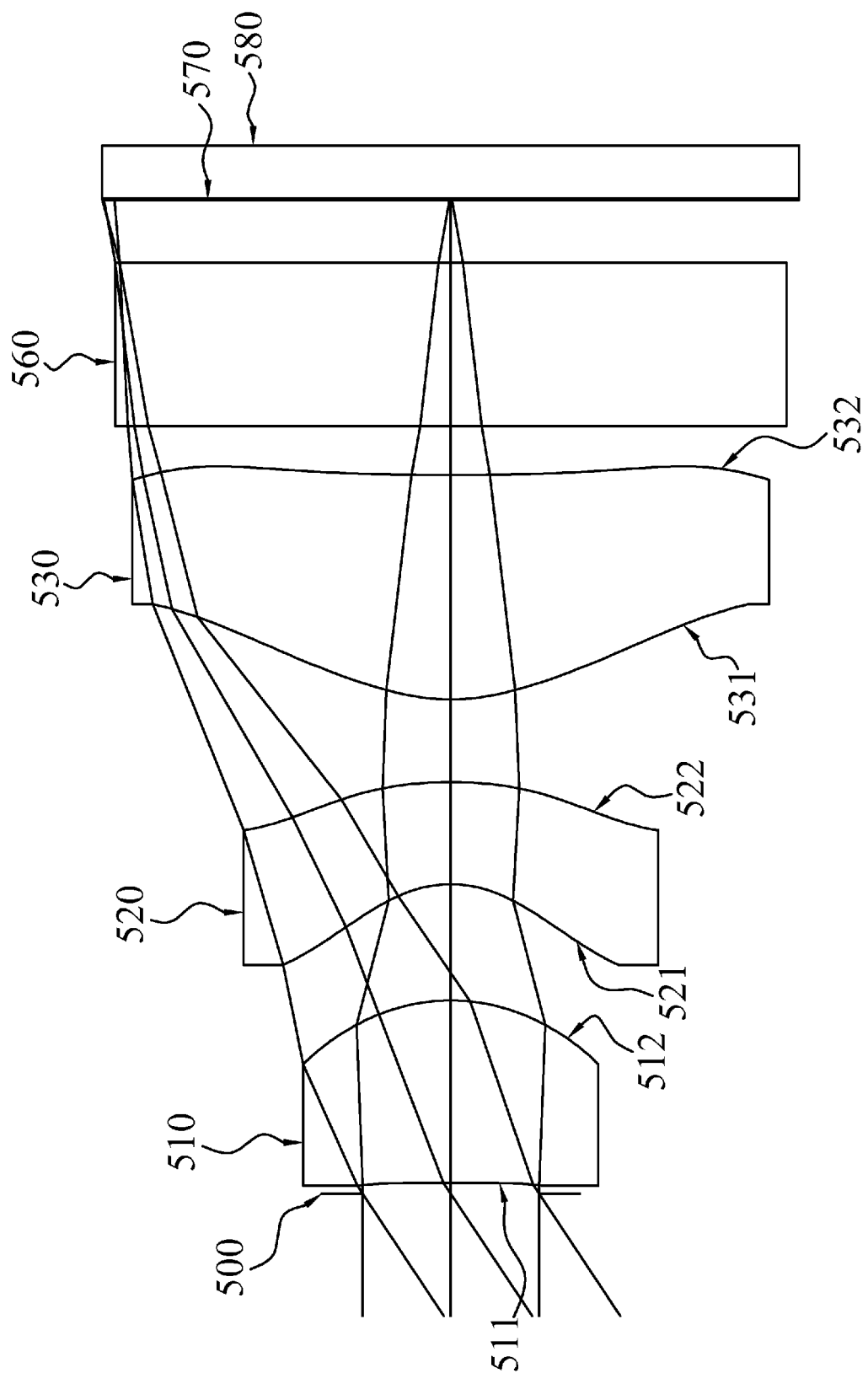
FIG. 5A is a schematic view of an optical lens assembly for image capture in accordance with the fifth preferred embodiment of the present invention.
Figure 5B:
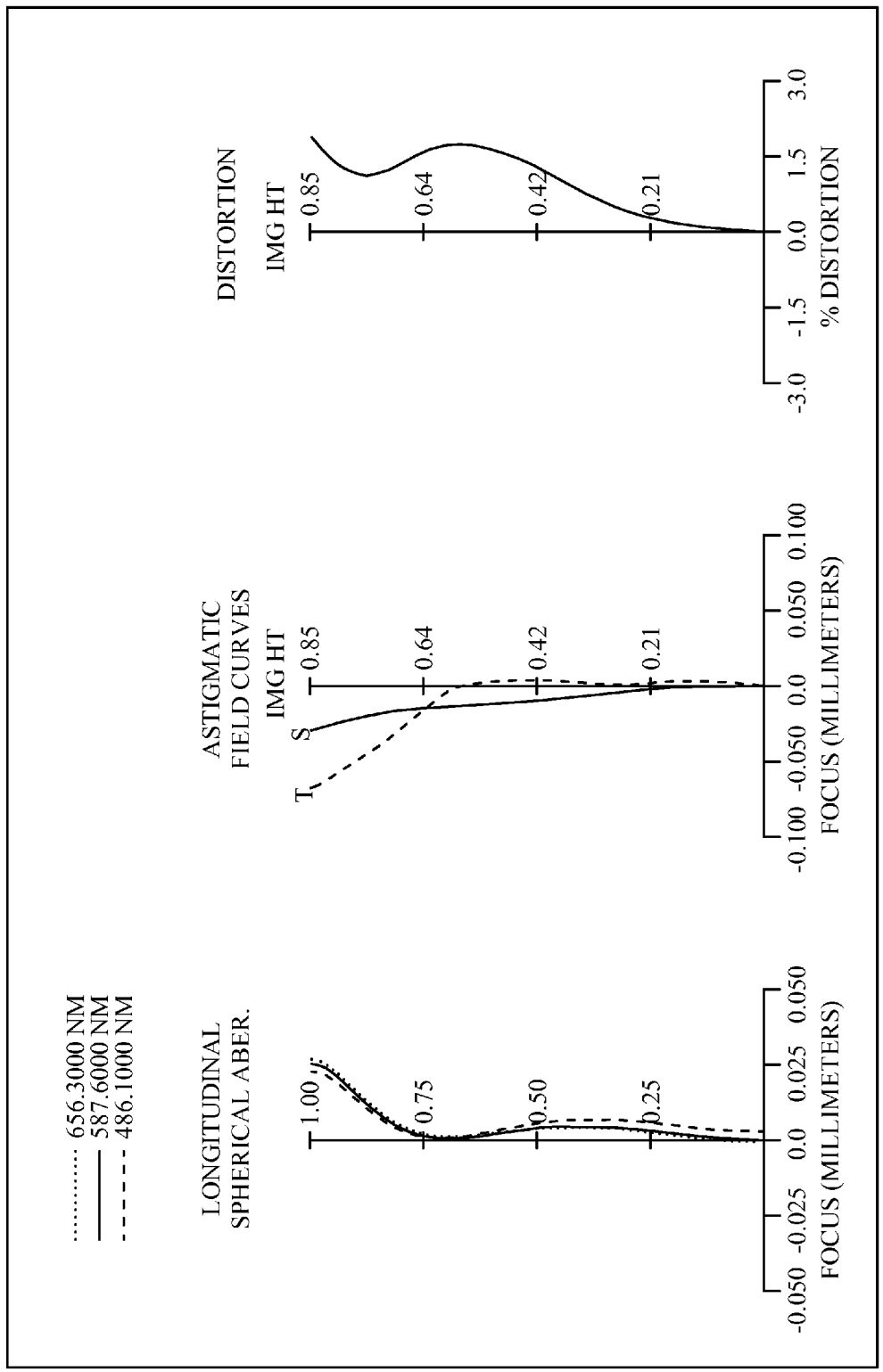
FIG. 5B is a series of aberration curves of the fifth preferred embodiment of the present invention.

With reference to FIGS. 5A and 5B for a schematic view of an optical lens assembly for image capture and a series of aberration curves in accordance with the fifth preferred embodiment of the present invention respectively, the optical lens assembly for image capture comprises three lens elements, an aperture stop (500) and an IR-filter (560). More specifically, the optical lens assembly for image capture, sequentially arranged from an object side to an image side along an optical axis, include: a plastic first lens element (510) with positive refractive power, having a concave object-side surface (511) and a convex image-side surface (512), and both object-side surface (511) and image-side surface (512) thereof being aspheric; a plastic second lens element with negative refractive power (520), having a concave object-side surface (521) and a convex image-side surface (522), and both object-side surface (521) and image-side surface (522) thereof being aspheric; a plastic third lens element with positive refractive power (530), having a convex object-side surface (531) and a concave image-side surface (532), and both object-side surface (531) and image-side surface (532) thereof being aspheric; at least one of the second lens element (520) and the third lens element (530) has at least one inflection point; and the IR-filter (560) is made of a plate glass and provided for adjusting the wavelength range of the light; and an image sensor (580) is installed at the image plane (570). With the combination of the three lens elements, the aperture stop (500) and the IR-filter (560), an image of the object to be photographed can be formed and projected onto the image sensor (580).

TABLE 13

Optical data of this preferred embodiment
f = 1.26 mm, Fno = 2.90, HFOV = 33.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.027 | | | | |
| 2 | Lens 1 | −19.641700 (ASP) | 0.447 | Plastic | 1.544 | 55.9 | 0.86 |
| 3 | | −0.459490 (ASP) | 0.285 | | | | |
| 4 | Lens 2 | −0.276620 (ASP) | 0.250 | Plastic | 1.634 | 23.8 | −0.68 |
| 5 | | −1.052160 (ASP) | 0.203 | | | | |
| 6 | Lens 3 | 0.500110 (ASP) | 0.550 | Plastic | 1.535 | 56.3 | 0.98 |
| 7 | | 6.523200 (ASP) | 0.120 | | | | |
| 8 | IR-filter | Plano | 0.400 | Glass | 1.517 | 64.2 | — |
| 9 | | Plano | 0.155 | | | | |
| 10 | Image | Plano | — | | | | |

Note:
Reference wavelength is 587.6 nm.
ASP stands for aspherical surfaces.

The optical data of this preferred embodiment are listed in Table 13, wherein the object-side surface and the image-side surface of the first lens element (510) to the third lens element (530) comply with the aspheric surface formula as given in Equation (12), and their aspheric coefficients are listed in Table 14 as follows:

TABLE 14

Aspheric coefficients of this preferred embodiment

| | Surface # | | |
|---|---|---|---|
| | 2 | 3 | 4 |
| k = | 2.88605E+01 | 0.00000E+00 | −8.44060E−01 |
| A4 = | −2.12100E+00 | 5.92300E−01 | 2.83628E+00 |
| A6 = | 1.24247E+01 | −3.23232E−01 | 2.27520E+01 |
| A8 = | −2.87693E+02 | 9.76970E+01 | 9.05664E+00 |
| A10 = | −5.11326E+02 | −7.78465E+02 | −8.47745E+02 |
| A12 = | −3.59039E+04 | 2.24999E+03 | 1.22845E+03 |
| A14 = | 9.79650E+05 | 7.14052E+01 | 1.43275E+04 |
| A16 = | | | −4.08195E+04 |

TABLE 14-continued

Aspheric coefficients of this preferred embodiment

| | Surface # | | |
|---|---|---|---|
| | 5 | 6 | 7 |
| k = | 2.51315E+00 | −4.55826E+00 | 1.86911E−01 |
| A4 = | −3.29086E+00 | −4.29501E−01 | −1.85341E−01 |
| A6 = | 4.13423E+01 | 3.68045E+00 | 2.08631E+00 |
| A8 = | −2.31413E+02 | −1.37042E+01 | −6.20053E+00 |
| A10 = | 7.74495E+02 | 2.10538E+01 | −1.10875E+00 |
| A12 = | −4.67814E+02 | −1.19071E+01 | 2.30123E+01 |
| A14 = | −4.40382E+03 | | −2.88669E+01 |
| A16 = | 8.97459E+03 | | 1.09507E+01 |

With reference to Table 13 and FIG. 5B for the optical lens assembly for image capture of this preferred embodiment, the focal length of the optical lens assembly for image capture is f=1.26 (mm), the overall aperture value (f-number) of the optical lens assembly for image capture is Fno=2.90, the half of maximum view angle is HFOV=33.6°. After the optical data of this preferred embodiment are calculated and derived, the optical lens assembly satisfies related relations as shown in Table 15 below, and the related symbols have been described above and thus will not be described again.

TABLE 15

Data of related relations of this preferred embodiment

| Relation | Data | Relation | Data |
|---|---|---|---|
| $V_1 - V_2$ | 32.1 | $f/f_1$ | 1.46 |
| $R_2/R_5$ | −0.92 | $f/f_3$ | 1.28 |
| $R_3/f$ | −0.22 | SL/TTL | 1.01 |
| $T_{23}/T_{12}$ | 0.71 | | |

According to the optical data as shown in Table 13 and the aberration curves as shown in FIG. 5B, the optical lens assembly for image capture in accordance with this preferred embodiment of the present invention provides good correction results in aspects of the longitudinal spherical aberration, astigmatic field curving, and distortion.

Sixth Preferred Embodiment

Figure 6A:
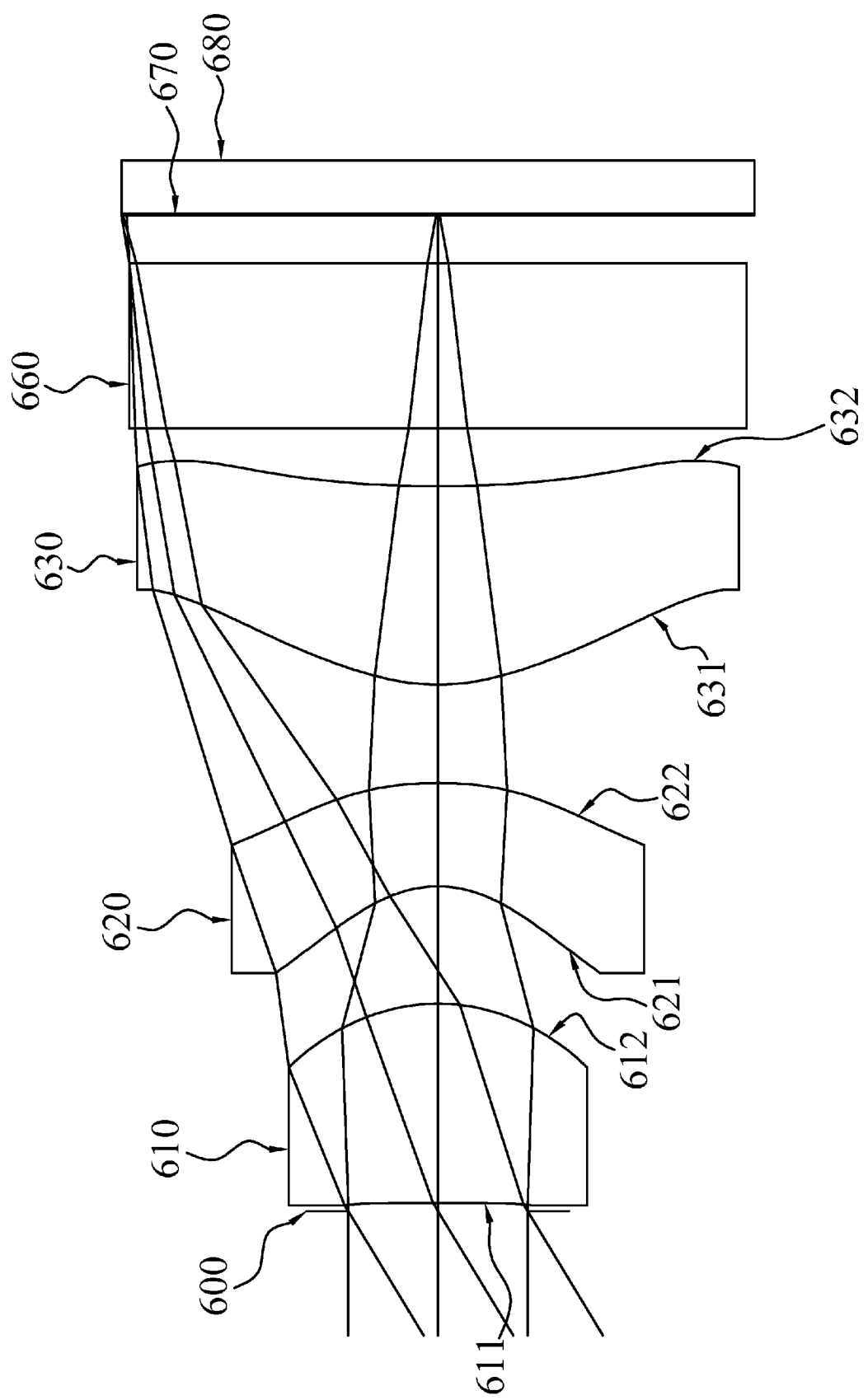
FIG. 6A is a schematic view of an optical lens assembly for image capture in accordance with the sixth preferred embodiment of the present invention.
Figure 6B:
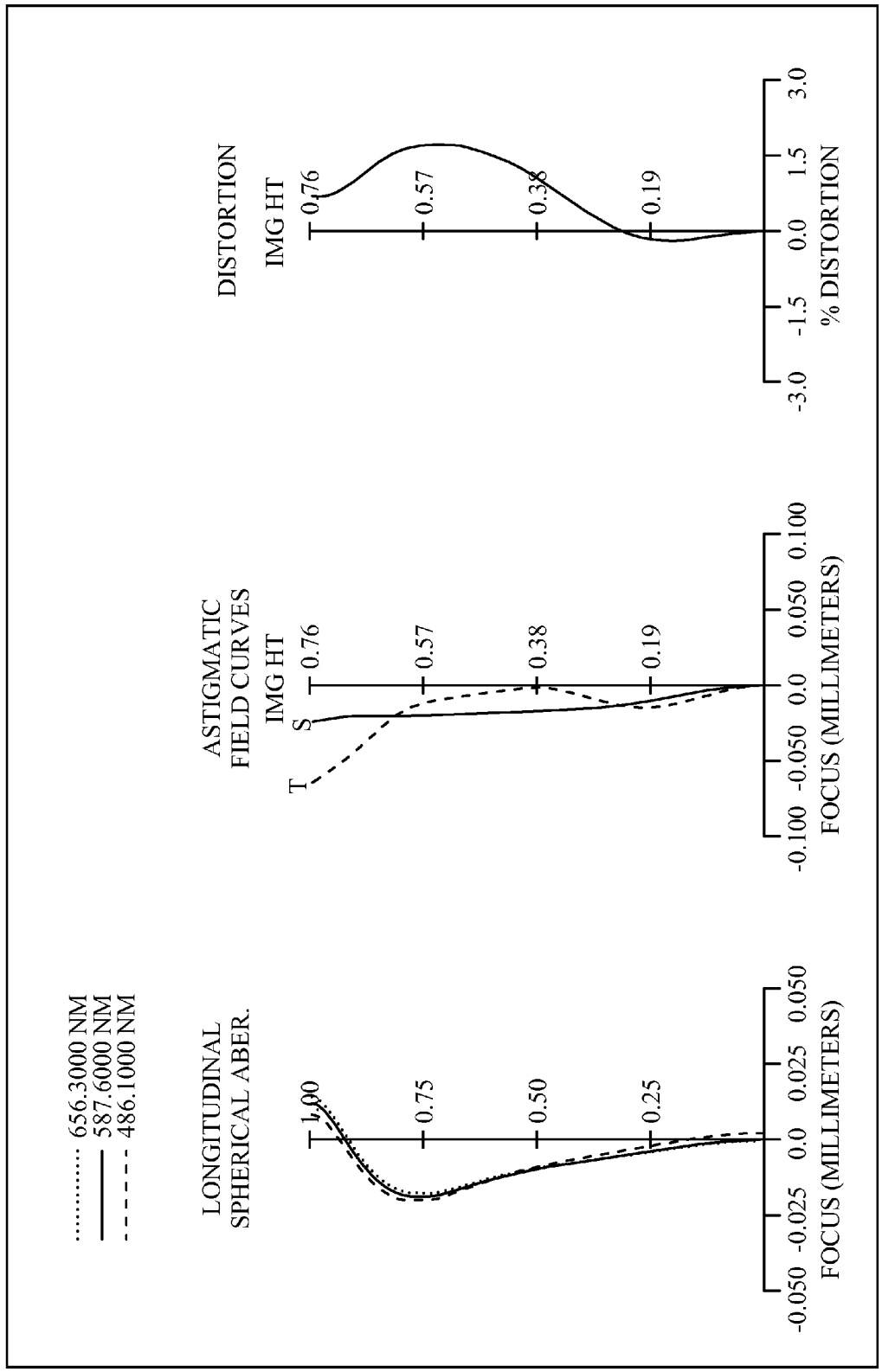
FIG. 6B is a series of aberration curves of the sixth preferred embodiment of the present invention.

With reference to FIGS. 6A and 6B for a schematic view of an optical lens assembly for image capture and a series of aberration curves in accordance with the sixth preferred embodiment of the present invention respectively, the optical lens assembly for image capture comprises three lens elements, an aperture stop (600) and an IR-filter (660). More specifically, the optical lens assembly for image capture, sequentially arranged from an object side to an image side along an optical axis, include: a plastic first lens element (610) with positive refractive power, having a concave object-side surface (611) and a convex image-side surface (612), and both object-side surface (611) and image-side surface (612) thereof being aspheric; a plastic second lens element with negative refractive power (620), having a concave object-side surface (621) and a convex image-side surface (622), and both object-side surface (621) and image-side surface (622) thereof being aspheric; a plastic third lens element with positive refractive power (630), having a convex object-side surface (631) and a concave image-side surface (632), and both object-side surface (631) and image-side surface (632) thereof being aspheric; at least one of the second lens element (620) and the third lens element (630) has at least one inflection point; and the IR-filter (660) is made of a plate glass and provided for adjusting the wavelength range of the light; and an image sensor (680) is installed at the image plane (670). With the combination of the three lens elements, the aperture stop (600) and the IR-filter (660), an image of the object to be photographed can be formed and projected onto the image sensor (680).

TABLE 16

Optical data of this preferred embodiment f = 1.26 mm, Fno = 2.90, HFOV = 31.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.020 | | | | |
| 2 | Lens 1 | −58.411200 (ASP) | 0.482 | Plastic | 1.543 | 56.5 | 0.86 |
| 3 | | −0.464910 (ASP) | 0.284 | | | | |
| 4 | Lens 2 | −0.276460 (ASP) | 0.250 | Plastic | 1.632 | 23.4 | −0.75 |
| 5 | | −0.899610 (ASP) | 0.238 | | | | |
| 6 | Lens 3 | 0.509970 (ASP) | 0.480 | Plastic | 1.543 | 56.5 | 1.08 |
| 7 | | 2.664140 (ASP) | 0.140 | | | | |
| 8 | IR-filter | Plano | 0.400 | Glass | 1.517 | 64.2 | — |
| 9 | | Plano | 0.115 | | | | |
| 10 | Image | Plano | — | | | | |

Note:

Reference wavelength is 587.6 nm.

ASP stands for aspherical surfaces.

The optical data of this preferred embodiment are listed in Table 16, wherein the object-side surface and the image-side surface of the first lens element (610) to the third lens element (630) comply with the aspheric surface formula as given in Equation (12), and their aspheric coefficients are listed in Table 17 as follows:

TABLE 17

Aspheric coefficients of this preferred embodiment

| | Surface # | | |
|---|---|---|---|
| | 2 | 3 | 4 |
| k = | −1.00000E+02 | 0.00000E+00 | −8.00726E−01 |
| A4 = | −1.27147E+00 | 5.81339E−01 | 2.26656E+00 |
| A6 = | −3.16407E+01 | 1.08527E+00 | 2.37377E+01 |
| A8 = | 8.42506E+02 | 7.42800E+01 | 1.00362E+01 |
| A10 = | 2.16702E+03 | −7.38572E+02 | −8.73665E+02 |
| A12 = | −5.20566E+05 | 2.25567E+03 | 1.21597E+03 |
| A14 = | 5.76484E+06 | 5.58171E+01 | 1.44217E+04 |
| A16 = | | | −3.82036E+04 |

| | Surface # | | |
|---|---|---|---|
| | 5 | 6 | 7 |
| k = | 1.52392E+00 | −3.68801E+00 | 4.32393E+00 |
| A4 = | −3.26781E+00 | −5.94567E−01 | −1.30133E−01 |
| A6 = | 4.09856E+01 | 4.52275E+00 | 1.93023E+00 |
| A8 = | −2.32916E+02 | −1.46060E+01 | −6.45130E+00 |
| A10 = | 7.70456E+02 | 1.86838E+01 | −1.20764E+00 |
| A12 = | −4.51645E+02 | −8.77288E+00 | 2.28998E+01 |
| A14 = | −4.27814E+03 | | −2.82976E+01 |
| A16 = | 8.60071E+03 | | 1.10873E+01 |

With reference to Table 16 and FIG. 6B for the optical lens assembly for image capture of this preferred embodiment, the focal length of the optical lens assembly for image capture is f=1.26 (mm), the overall aperture value (f-number) of the optical lens assembly for image capture is Fno=2.90, the half of maximum view angle is HFOV=31.2°. After the optical data of this preferred embodiment are calculated and derived, the optical lens assembly satisfies related relations as shown in Table 18 below, and the related symbols have been described above and thus will not be described again.

TABLE 18

Data of related relations of this preferred embodiment

| Relation | Data | Relation | Data |
|---|---|---|---|
| $V_1 - V_2$ | 33.1 | $f/f_1$ | 1.46 |
| $R_2/R_5$ | −0.91 | $f/f_3$ | 1.17 |
| $R_3/f$ | −0.22 | SL/TTL | 1.01 |
| $T_{23}/T_{12}$ | 0.84 | | |

According to the optical data as shown in Table 16 and the aberration curves as shown in FIG. 6B, the optical lens assembly for image capture in accordance with this preferred embodiment of the present invention provides good correction results in aspects of the longitudinal spherical aberration, astigmatic field curving, and distortion.

In the optical lens assembly for image capture of the present invention, the lens can be made of glass or plastic. If the lens is made of glass, the selection of the refractive power for the thin optical lens assembly can be more flexible. If the lens is made of plastic, the production cost can be reduced effectively. In addition, an aspherical surface can be formed on an optical surface of the lens, and the aspherical surface can be easily manufactured into shapes other than those within the limitation of a spherical surface to have more control factors for eliminating aberrations, so as to reduce the number of lenses used and the total length of the optical lens assembly for image capture of the present invention.

In the optical lens assembly for image capture of the present invention, if the lens surface is convex, the lens surface in proximity to the optical axis is convex; and if the lens surface is concave, the lens surface in proximity to the optical axis is concave.

In the optical lens assembly for image capture of the present invention, at least one stop such as a glare stop or a field stop is provided for reducing stray lights to improve the image quality.

Tables 1 to 18 show changes of values of an optical lens assembly for image capture in accordance with different preferred embodiments of the present invention respectively. However, the changes of values in the preferred embodiments of the present invention are obtained from experiments, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical lens assembly for image capture, sequentially arranged from an object side to an image side with no intervening lenses, comprising:

a first lens element with positive refractive power, having a concave object-side surface in proximity to an optical axis and a convex image-side surface in proximity to the optical axis;

a second lens element with negative refractive power, having a concave object-side surface in proximity to the optical axis and a convex image-side surface in proximity to the optical axis; and a third lens element with positive refractive power, having a convex object-side surface in proximity to the optical axis and a concave image-side surface in proximity to the optical axis;

wherein the optical lens assembly has a total of three lens elements with refractive power, and wherein f is a focal length of the optical lens assembly for image capture, $f_1$ is a focal length of the first lens element, and the following relation is satisfied:

$1.0 < f/f_1 < 1.9$.

2. The optical lens assembly for image capture of claim 1, wherein the second lens element and the third lens element are made of plastic; the object-side surface and the image-side surface of the second lens element are aspheric; and the object-side surface and the image-side surface of the third lens element are aspheric.

3. The optical lens assembly for image capture of claim 2, further comprising a stop; wherein SL is an axial distance from the stop to an image plane of the optical lens assembly for image capture, TTL is an axial distance from the object-side surface of the first lens element to the image plane, and the following relation is satisfied:

$0.90 < SL/TTL < 1.20$.

4. The optical lens assembly for image capture of claim 3, wherein f is the focal length of the optical lens assembly for image capture, $f_1$ is the focal length of the first lens element, and the following relation is satisfied:

$1.2 < f/f_1 < 1.6$.

5. The optical lens assembly for image capture of claim 3, wherein $R_2$ is a curvature radius of the image-side surface of the first lens element, $R_5$ is a curvature radius of the object-side surface of the third lens element, and the following relation is satisfied:

$$-2.5<R_2/R_5<-0.5.$$

6. The optical lens assembly for image capture of claim 3, wherein $T_{12}$ is an axial distance between the first lens element and the second lens element, $T_{23}$ is an axial distance between the second lens element and the third lens element, and the following relation is satisfied:

$$0<T_{23}/T_{12}<1.3.$$

7. The optical lens assembly for image capture of claim 3, wherein $v_1$ is an Abbe number of the first lens element, $v_2$ is an Abbe number of the second lens element, and the following relation is satisfied:

$$24<v_1-v_2<40.$$

8. The optical lens assembly for image capture of claim 7, wherein $R_3$ is a curvature radius of the object-side surface of the second lens element, f is the focal length of the optical lens assembly for image capture, and the following relation is satisfied:

$$-1.0<R_3/f<0.$$

9. The optical lens assembly for image capture of claim 2, wherein $R_2$ is a curvature radius of the image-side surface of the first lens element, $R_5$ is a curvature radius of the object-side surface of the third lens element, and the following relation is satisfied:

$$-1.2<R_2/R_5<-0.8.$$

10. The optical lens assembly for image capture of claim 2, wherein at least one of the second lens element and the third lens element has at least one inflection point.

11. The optical lens assembly for image capture of claim 2, wherein $f_1$ is the focal length of the first lens element, $f_2$ is a focal length of the second lens element, $f_3$ is a focal length of the third lens element, and the following relation is satisfied:

$$f_3>f_1>|f_2|.$$

12. The optical lens assembly for image capture of claim 2, wherein $R_3$ is a curvature radius of the object-side surface of the second lens element, f is the focal length of the optical lens assembly for image capture, and the following relation is satisfied:

$$-0.4<R_3/f<0.$$

13. An optical lens assembly for image capture, sequentially arranged from an object side to an image side with no intervening lenses, comprising:
 a first lens element with positive refractive power, having a concave object-side surface in proximity to an optical axis and a convex image-side surface in proximity to the optical axis;
 a second lens element with negative refractive power, having both object-side surface and image-side surface being aspheric, and made of plastic; and
 a third lens element with positive refractive power, having a convex object-side surface in proximity to the optical axis and a concave image-side surface in proximity to the optical axis, and both object-side surface and image-side surface being aspheric, and made of plastic;
 wherein the optical lens assembly has a total of three lens elements with refractive power, and wherein, $R_2$ is a curvature radius of the image-side surface of the first lens element, $R_5$ is a curvature radius of the object-side surface of the third lens element, f is a focal length of the optical lens assembly for image capture, $f_3$ is a focal length of the third lens element, and the following relations are satisfied:

$$-2.5<R_2/R_5<-0.5;$$

$$0.7<f/f_3<1.4.$$

14. The optical lens assembly for image capture of claim 13, wherein at least one of the second lens element and the third lens element has at least one inflection point.

15. The optical lens assembly for image capture of claim 14, wherein $v_1$ is an Abbe number of the first lens element, $v_2$ is an Abbe number of the second lens element, and the following relation is satisfied:

$$24<v_1-v_2<40.$$

16. The optical lens assembly for image capture of claim 14, wherein f is the focal length of the optical lens assembly for image capture, $f_1$ is a focal length of the first lens element, and the following relation is satisfied:

$$1.2<f/f_1<1.6.$$

17. The optical lens assembly for image capture of claim 14, wherein $f_1$ is a focal length of the first lens element, $f_2$ is a focal length of the second lens element, $f_3$ is the focal length of the third lens element, and the following relation is satisfied:

$$f_3>f_1>|f_2|.$$

18. The optical lens assembly for image capture of claim 14, wherein $R_3$ is a curvature radius of the object-side surface of the second lens element, f is the focal length of the optical lens assembly for image capture, and the following relation is satisfied:

$$-0.4<R_3/f<0.$$

19. The optical lens assembly for image capture of claim 13, wherein $R_2$ is the curvature radius of the image-side surface of the first lens element, $R_5$ is the curvature radius of the object-side surface of the third lens element, and the following relation is satisfied:

$$-1.2<R_2/R_5<-0.8.$$

20. The optical lens assembly for image capture of claim 13, wherein the second lens element has a concave object-side surface in proximity to the optical axis and a convex image-side surface in proximity to the optical axis.

* * * * *